United States Patent
Awal et al.

(10) Patent No.: US 11,431,565 B2
(45) Date of Patent: Aug. 30, 2022

(54) DYNAMIC TRAFFIC-AWARE INTERFACE QUEUE SWITCHING AMONG PROCESSOR CORES

(71) Applicant: Intel Corporation, Santa Clara, CA (US)

(72) Inventors: Mohammad Abdul Awal, Celbridge (IE); Jasvinder Singh, Shannon (IE); Reshma Pattan, Tuam (IE); David Hunt, Meelick (IE); Declan Doherty, Clondalkin (IE); Chris Macnamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 16/160,176

(22) Filed: Oct. 15, 2018

(65) Prior Publication Data
US 2019/0052530 A1    Feb. 14, 2019

(51) Int. Cl.
*H04L 41/0816* (2022.01)
*H04L 49/90* (2022.01)
*H04L 43/16* (2022.01)
*H04L 43/0894* (2022.01)
*H04L 49/00* (2022.01)
*H04L 43/10* (2022.01)

(52) U.S. Cl.
CPC ...... *H04L 41/0816* (2013.01); *H04L 43/0894* (2013.01); *H04L 43/16* (2013.01); *H04L 49/90* (2013.01); *H04L 43/10* (2013.01); *H04L 49/70* (2013.01)

(58) Field of Classification Search
CPC . H04L 41/0816; H04L 43/0894; H04L 43/16; H04L 49/90; H04L 43/10; H04L 49/70; Y02D 10/00; G06F 9/4893
See application file for complete search history.

(56) References Cited

U.S. PATENT DOCUMENTS

| 2004/0218617 | A1* | 11/2004 | Sagfors | H04L 47/26 370/412 |
|---|---|---|---|---|
| 2006/0056406 | A1* | 3/2006 | Bouchard | H04L 12/56 370/389 |
| 2009/0235050 | A1* | 9/2009 | Raghunath | G06F 9/5038 712/203 |

(Continued)

FOREIGN PATENT DOCUMENTS

| WO | 2016101099 A9 | 11/2016 |
|---|---|---|
| WO | 2017213747 A1 | 12/2017 |

OTHER PUBLICATIONS

"A Performance Analysis Methodology for Multicore, Multithreaded Processors"; Ju et al.; IEEE Transactions on Computers, vol. 63, No. 2, Feb. 2014 (Year: 2014).*

(Continued)

*Primary Examiner* — Benjamin H Elliott, IV
(74) *Attorney, Agent, or Firm* — Compass IP Law PC (57) ABSTRACT

Examples include techniques for monitoring a data packet transfer rate at an interface queue, and based at least in part on a comparison of the data packet transfer rate to a threshold, assigning the interface queue from a core of a first class to a core of a second class or assigning the interface queue from a core of the second class to a core of the first class.

23 Claims, 7 Drawing Sheets

(56) References Cited

U.S. PATENT DOCUMENTS

| | | | | |
|---|---|---|---|---|
| 2010/0332869 | A1* | 12/2010 | Hsin | G06F 9/5094 |
| | | | | 713/320 |
| 2011/0022871 | A1* | 1/2011 | Bouvier | G06F 1/3206 |
| | | | | 713/340 |
| 2014/0025857 | A1* | 1/2014 | Lippett | G06F 13/24 |
| | | | | 710/267 |
| 2016/0239074 | A1* | 8/2016 | Lee | G06F 9/50 |
| 2016/0306416 | A1* | 10/2016 | Browne | G06F 9/4893 |
| 2018/0210532 | A1* | 7/2018 | Zhang | G06F 9/5094 |
| 2019/0041957 | A1 | 2/2019 | Hunt et al. | |
| 2019/0052530 | A1* | 2/2019 | Awal | H04L 43/0894 |
| 2019/0114206 | A1* | 4/2019 | Murugesan | H04L 47/54 |

OTHER PUBLICATIONS

"A Transport-Friendly NIC for Multicore/Multiprocessor Systems"; Wu et al.; IEEE Transactions on Parallel and Distributed Systems, vol. 23, No. 4, Apr. 2012 (Year: 2012).*

"Experimental Demonstration of DPDK Optimised VNF Implementation of Virtual DBA in a Multi-Tenant PON"; Slyne et al; 2018 European Conference on Optical Communication (ECOC); Sep. 23-27, 2018 (Year: 2018).*

"QcAffin: A Hardware Topology Aware Interrupt Affinitizing and Balancing Scheme for Multi-Core and Multi-Queue Packet Processing Systems"; Huang et al. IEEE Transactions on Parallel and Distributed Systems, vol. 27, No. 6, Jun. 2016 (Year: 2016).*

Extended European Search Report for Patent Application No. 19183500.8, dated Dec. 20, 2019, 11 pages.

"DPDK Power Manual" http://doc.dpdk.org/guides/prog_guide/power_man.html, printed Sep. 6, 2018, 3 pgs.

European First Office Action for Patent Application No. 19183500.8, dated Sep. 1, 2021, 6 pages. (EP Exam Report Article 94(3) EPC).

Emmerich, Paul, et. al., "Performance Characteristics of Virtual Switching", 2014 IEEE 3rd International Conference an Cloud Networking (CloudNet), © 2014 EEE, 6 pages.

Emmerich, Paul, et. al., "Throughput and Latency of Virtual Switching with Open vSwitch: A Quantitative Analysis", https://link.springer.com/article/10.1007/s10922-017-9417-0, Published Jul. 21, 2017, 15 pages.

* cited by examiner

DYNAMIC TRAFFIC-AWARE INTERFACE QUEUE SWITCHING AMONG PROCESSOR CORES

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2018, Intel Corporation, All Rights Reserved.

BACKGROUND

Packet processing applications typically provision a number of "worker" processing threads running on processor cores (sometimes called "worker cores") to perform the processing work of the applications. Worker cores consume packets from dedicated queues which in some scenarios is fed by one or more network interface controllers (NICs) or by input/output (I/O) threads. The number of worker cores provisioned is usually a function of the maximum predicted throughput. However, packet traffic rates vary widely both in short durations (e.g., seconds) and over longer periods of time (for example, many networks experience significantly less traffic at night or on a weekend).

In some packet processing applications, queues are polled continuously by the worker cores. This results in inefficient core resource utilization because the worker cores continue to poll the queues at a constant rate regardless of the current packet traffic rate. Some existing power saving schemes permit scaling up or down processor frequency depending on traffic rates. However, processor frequency changes impact usage of the entire set of queues accessed by a processor. If a processor core is polling more than one queue, changing the processor's frequency impacts the polling rate of all queues accessed by the processor. This approach does not take into account the individual traffic rate of each queue. Since some queues have a higher rate of traffic than others, this results in suboptimal processor utilization.

DETAILED DESCRIPTION

Embodiments of the present invention provide an approach to dynamically assigning data packet traffic interface queues to cores running at different frequencies using power savings mechanisms without impacting packet processing performance. Polling rates of the interface queues may be adjusted based on the data packet transfer rate of interface queues by dynamically assigning high volume interface queues to high frequency cores and low volume interface queues to low frequency cores.

In one embodiment, cores may be divided into at least two classes: high frequency or low frequency. High frequency cores have their processor clock frequency set to a first predetermined speed. Low frequency cores have their processor clock frequency set to a second predetermined speed, lower than the first predetermined speed. In other embodiments of the present invention, other numbers of classes may be used, such as three, four, five, and so on, each class having a different processor clock frequency. Having more classes results in the capability for a finer granularity in controlling dynamic assignment of interface queues. Two classes will be described herein, but it is understood that any number of classes and associated processor frequencies, and various throughput thresholds to be used to match traffic to each class, may be used in various embodiments.

Embodiments of the present invention may be used with a software switch (also called a virtual switch). In one embodiment, the virtual switch is an Open vSwitch (OVS) application program integrated with Data Plane Development Kit (DPDK) (i.e., an OVS-DPDK) running on a multicore computing system for high performance virtual machine (VM) to virtual machine (or container to container), or physical machine (PHY) to virtual machine to physical machine (or PHY to container to PHY), packet transfers. In other embodiments, other virtual switch implementations may be used. To support many VMs or containers (such as 64 or more, for example), the virtual switch requires a multicore processing environment to scale up processing throughput as traffic rates increase.

Figure 1:
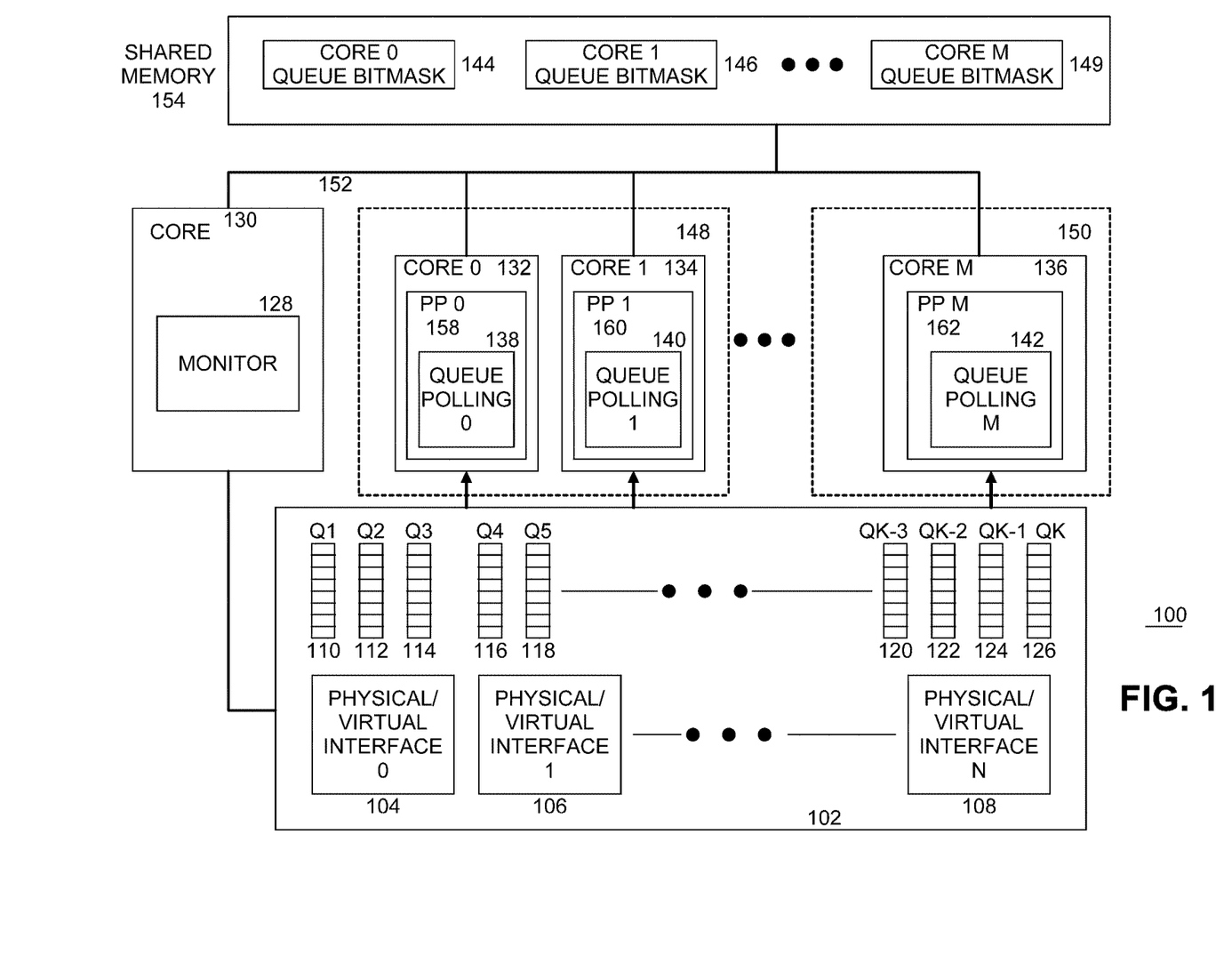
FIG. 1 illustrates an example system architecture.

FIG. 1 illustrates an example system architecture 100 of embodiments of the present invention. System 100 includes a collection 102 of I/O interfaces and interface queues. Collection 102 includes a plurality of physical or virtual interfaces, such as physical/virtual interface 0 104, physical/virtual interface 1 106, . . . physical/virtual interface N, where N is a natural number. Each physical/virtual interface includes one or more of a physical NIC, a virtual NIC, a VM, or any other physical or virtual component to provide data packets to system 100. In some systems the number of physical/virtual interfaces may number in the tens, hundreds, or even thousands. Collection 102 includes a plurality of interface queues to store data packets, such as Q1 110, Q2 112, Q3 114, Q4 116, Q5 118, . . . QK-3 120, QK-2 122, QK-1 124, and QK 126, where K is a natural number. In some systems the number of interface queues may number in the tens, hundreds, thousands, or even tens of thousands. The memory size allotted for each interface queue is implementation dependent. Any set of zero or more interface queues may be assigned to a physical/virtual interface, whereby the physical/virtual interface stores data packets into assigned interface queues. For example, physical/virtual interface 0 104 may be assigned interface queues Q1 110, Q2 112, and Q3 114; physical/virtual interface 1 106 may be assigned interface queues Q4 116 and Q5 118; and physical/virtual interface N 108 may be assigned interface queues QK-3 120, QK-2 122, QK-1 124, and QK 126.

System 100 includes a plurality of cores, such as core 0 132, core 1 134, . . . core M 136, where M is a natural number. A core is running at a processor frequency. In an embodiment, a core is set to run at either a high frequency (HF) or a low frequency (LF). For example, core 0 132 and core 1 134 are in a high frequency class of cores 148 running at a high frequency, and core M is in a low frequency class of cores 150 running at a low frequency. Generally, a high frequency core is processing a higher traffic rate of packets than a low frequency core, and a high frequency core uses more power than a low frequency core. Any set of cores may be in the high frequency class of cores, and any set of cores may be in the low frequency class of cores, with the caveat that the two sets are mutually exclusive (a core can be moved between the classes but cannot be a high frequency core and a low frequency core at the same time).

A core can execute a packet processing functionality. For example, core 0 132 executes packet processing (PP) function 0 158, core 1 134 executes PP 1 160, and core M executes PP M 162. Collectively, in one embodiment PP 0 158, PP1 160, . . . PP M 162 are implemented in software as a virtual switch. A PP application includes zero or more queue polling logic elements to read data packets from one or more interface queues assigned to a core. In one embodiment, a queue polling logic element is implemented in software instructions being executed by the core (e.g., within the PP application). In another embodiment, a queue polling logic element is implemented in circuitry in the core. For example, high frequency core 0 132 includes queue polling 0 138 to read data packets from interface queues Q1 110, Q2 112, and Q3 114 (assigned to physical/virtual interface 0 104 in this example). High frequency core 1 134 includes queue polling 1 140 to read data packets from interface queues Q4 116 and Q5 118 (assigned to physical/virtual interface 1 106 in this example). Low frequency core M 136 includes queue polling M 142 to read data packets from interface queues QK-3 120, QK-2 122, QK-1 124, and QK 126 (assigned to physical/virtual interface N 108 in this example).

System 100 includes shared memory 154 that is accessible by any of the cores over interconnect 152. In an embodiment, access to shared memory 154 is controlled by a known mutual exclusion locking mechanism. In an embodiment, shared memory 154 stores one queue bitmask for each core in the system 144. For example, shared memory 154 includes core 0 queue bitmask 144, core 1 queue bitmask 146, . . . core M queue bitmask 149. A queue bitmask includes K bits, with one bit representing each interface queue. In an embodiment, a core (such as core 0 132 executing PP 0 158) reads the core's associated queue bitmask 144 and when a bit of core 0 queue bitmask 144 is set to 1, core 0 132 polls the interface queue referenced by the bit using the core's queue polling logic element (e.g., queue polling 0 138 of PP 0 158).

System 100 includes core 130 to include monitor 128. In an embodiment, core 130 is a standalone core not used for processing packets from interface queues (e.g., core 130 does not execute a packet processing application). In another embodiment, core 130 is one of the high frequency cores 148. In an embodiment, monitor 128 is implemented in software executing on core 130. In another embodiment, monitor 128 is implemented in circuitry in core 130. Monitor 128 initializes queue bitmasks 144, 146, . . . 149 for cores 132, 134, . . . 136, respectively. Monitor 128 monitors data packet transfer rates at the interface queues (either input to or output from interface queues) and adjusts queue bitmasks 144, 146, . . . 149 based at least in part on the monitored data packet transfer rates of the interface queues. Generally, when a data packet transfer rate of an interface queue indicates lower traffic, then the interface queue is dynamically reassigned from a HF core to a LF core, and when a data packet transfer rate of an interface queue indicates higher traffic, then the interface queue is dynamically reassigned from a LF core to a HF core. Thus, system 100 dynamically adjusts during runtime which cores are handling which interface queues based on data packet transfer rates of the interface queues. In an embodiment, the granularity of control over system power consumption is therefore at the interface queue level. When LF cores handle data packet transfers over more interface queues, system power consumption is lower (since LF cores use less power than HF cores). When HF cores handle data transfers over more interface queues, system power consumption is higher (since HF cores use more power than LF cores).

In an embodiment, core 130 of system 100 includes a capability to monitor the data packet transfer rates at core 0 132, core 1 134, . . . core M 136. When the data packet transfer rate at a core is less than or equal to a predetermined threshold, the frequency of the core is reduced (e.g., the core is moved from a high frequency to a low frequency). When the data packet transfer rate at a core is more than the predetermined threshold, the frequency of the core is increased (e.g., the core is moved from a low frequency to a high frequency). Thus, system 100 dynamically adjusts the frequencies of cores based at least in part on data packet transfer rates at the cores. In an embodiment, when a core is moved from a high frequency to a low frequency, or when a core is moved from a low frequency to a high frequency, monitor 128 reassesses the mapping of interface queues to cores and amends queue bitmasks 144, 146, . . . 149 accordingly.

In one embodiment, system 100 changes the frequency of a processor by using a DPDK Power Management library feature. In one embodiment, using a Linux® kernel, a cpufreq module for processor frequency scaling for each core may be used.

Figure 2:
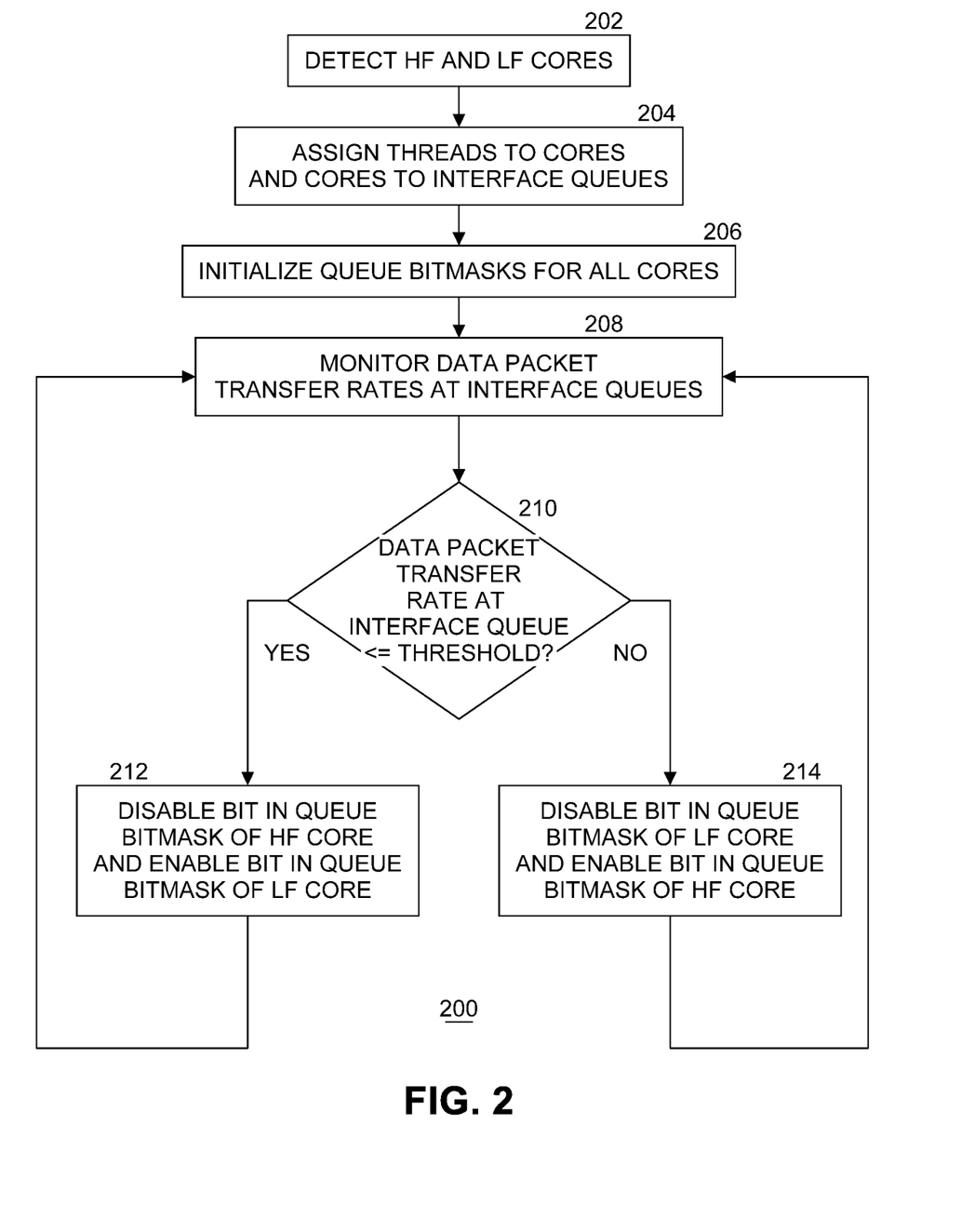
FIG. 2 illustrates an example flow diagram of dynamic assignment of interface queues.

FIG. 2 illustrates an example flow diagram of dynamic assignment of interface queues. In one embodiment the steps of FIG. 2 are performed by monitor 128 on core 130. As part of initialization of one or more of packet processing applications PP0 158, PP 1 160, . . . PPM 162 executing on core 0 132, core 1 134, . . . core M 136, respectively, HF and LF cores in system 100 are detected at block 202. In an embodiment, monitor 128 stores the initial frequency settings and associated core classes and updates this information during runtime as needed (e.g., when a core moves from a high frequency setting to a low frequency setting and vice versa). In an embodiment, all cores are HF cores at the time of system initialization (i.e., high frequency is the default setting for each core). At block 204, processing threads of packet processing applications are assigned to cores and cores are assigned to interface queues. In an embodiment, one thread per core is assigned. At block 206, queue bitmasks 144, 146, . . . 149 for all cores are initialized to reflect the detected HF and LF cores and initial interface queue assignments. During runtime of packet processing applications, monitor 128 monitors data packet transfer rates at interface queues at block 208. How often the monitoring occurs is implementation dependent.

At block 210, in one embodiment, when comparing a data transfer rate to a predetermined threshold, if the data packet transfer rate at an interface queue is less than or equal to the predetermined threshold, then processing continues with block 212. At block 212, the bit in the queue bitmask of the HF core associated with the interface queue is disabled (i.e., cleared), and the bit in the queue bitmask of a LF core to now be associated with the interface queue is enabled (i.e., set). This reassigns the interface queue from a HF core to a LF core for subsequent processing of data packets. If the interface queue was already assigned to a LF core (e.g., the value of the bit in the queue bitmask is already the value the bit would be set to in block 212, then the bit setting operation of block 214 is omitted.

At block 210, in one embodiment, when comparing a data transfer rate to a predetermined threshold, if a data packet transfer rate at an interface queue is greater than a predetermined threshold, then processing continues with block 214. At block 214, the bit in the queue bitmask of the LF core associated with the interface queue is disabled (i.e., cleared), and the bit in queue bitmask of a HF core associated with the interface queue is enabled (i.e., set). This moves the interface queue from a LF core to a HF core for subsequent processing of data packets. If the interface queue was already assigned to a HF core (e.g., the value of the bit in the queue bitmask is already the value the bit would be set to in block 214, then the bit setting operation of block 214 is omitted. This scenario occurs when no change to the assignment of the interface queue to a core is needed.

Processing in either block 212 or block 214 continues with further monitoring at block 208. In an embodiment, blocks 208-214 are performed for all interface queues.

Thus, queue bitmasks 144, 146, ... 149 are changed depending on the monitored data packet transfer rates at the interface queues. When the queue bitmasks are changed, this results in corresponding changes in assignments of interfaces queues to cores. Changing the interface queues assignments to cores results in different power consumption amounts of the system because different cores are now being used to process data packets from interface queues. This enables efficient processor core utilization according to traffic rates by dynamically assigning interface queues to cores based at least in part on the core frequencies. This approach is scalable for multicore virtual switches running with any number of high bandwidth physical/virtual interfaces. This approach can be used in conjunction with processor power management schemes by assigning different frequencies to different cores for dynamic interface queues assignments.

In an embodiment, whenever the frequency of a core is changed (either from a high frequency to a low frequency, or from a low frequency to a high frequency), processing may be returned to block 202 detect the changed frequency characteristics of the cores in system 100.

Let's assume that C is a set of m processor cores that the application is running on.

$$C=\{c_i\}, \text{ where } i=[0,m-1]$$

$C_H$ is a subset of C where all the cores in $C_H$ are running at high frequency. $C_L$ is a subset of C where all the cores in $C_L$ are running in low frequency. $C_H$ and $C_L$ are mutually exclusive. For simplicity let us assume that $C_H$ and $C_L$ are not empty. There are separate sets of processes $P_H$ and $P_L$ which run on each of $C_H$ and $C_L$ respectively.

Let's assume that Q is a set of k interface queues on which the process $P_H$ and $P_L$ of packet processing applications are polling for data.

$$Q=\{q_i\}, \text{ where } i \in [0,k-1]$$

$Q_H$ is a subset of Q where all the interface queues are associated with high frequency cores and are polled by $P_H$. $Q_L$ is a subset of Q where all the interface queues are associated with low frequency cores and are polled by $P_L$. $Q_H$ and $Q_L$ are mutually exclusive.

Let's assume that B is a bitmask of k bits which represents k interface queues as below.

$$B=b_{k-1}b_{k-2}\ldots b_0$$

The bit $b_i=1$ represents an interface queue as enabled in that bitmask where i=[0, k-1]. There is a queue bitmask for each core to be used by processes $P_H$ and $P_L$. The queue bitmasks contain one bit for each interface queue that the processes poll for data packet traffic.

A monitoring process (e.g., monitor 128) running on a core (preferably on a high frequency core) is responsible to get the statistic counters for each of the interface queues to indicate the data packet transfer rate. Let's assume that $S_i$ is the statistic counter for each interface queue where i=[0, k-1]. Let's say there is a traffic threshold $T_i$ which is used to determine interface queue i managed by a particular process.

Figure 3:
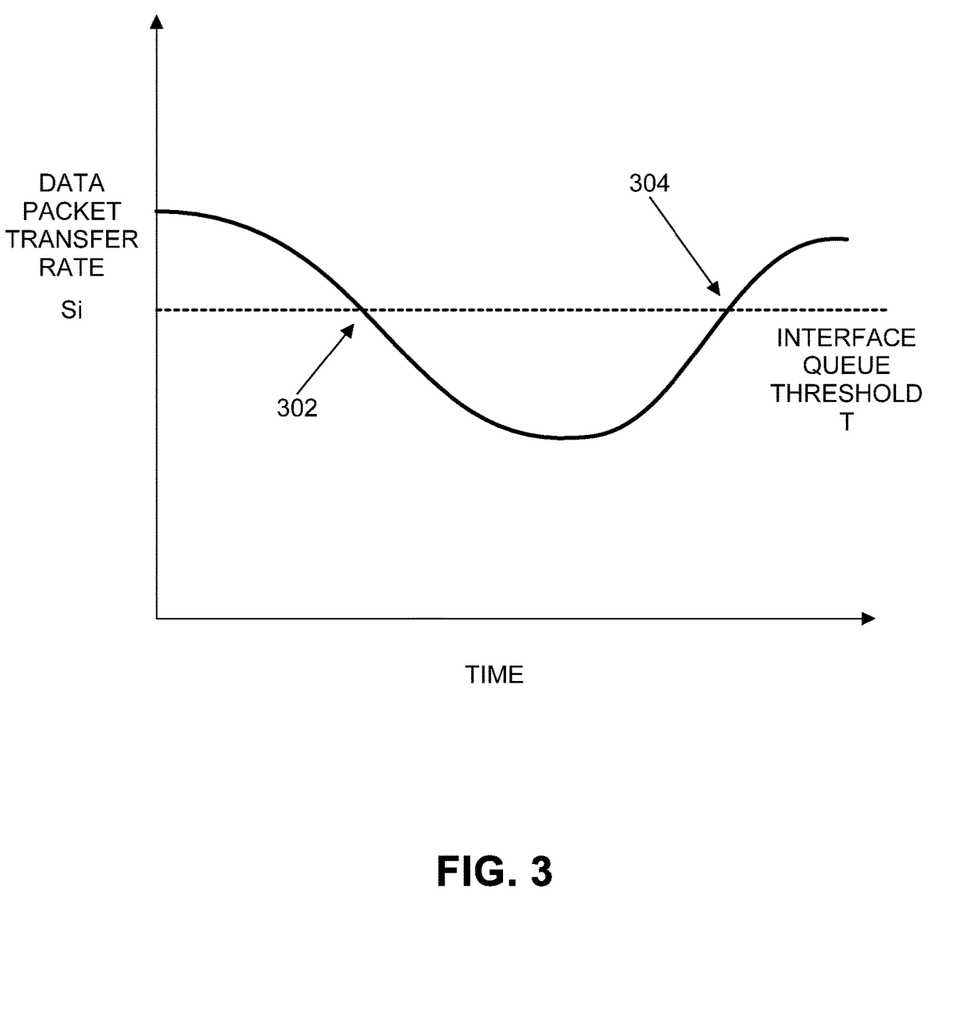
FIG. 3 illustrates an example time series representation of dynamic assignment of interface queues based on traffic rate.

FIG. 3 illustrates an example time series representation of dynamic assignment of interface queues based on traffic rate. When a data packet transfer rate Si for an interface queue goes below an interface queue threshold T at point 302, then block 212 of FIG. 2 is performed to disable a bit for this interface queue in the queue bitmask of the HF core assigned to this interface queue and enable a bit for this interface queue in the queue bitmask of a LF core. This causes the system to adjust to the lower data packet transfer rate by reassigning the interface queue from a HF core to a LF core. When a data packet transfer rate Si for an interface queue goes above an interface queue threshold T at point 304, then block 214 of FIG. 2 is performed to disable a bit for this interface queue in the queue bitmask of the LF core assigned to this interface queue and enable a bit for this interface queue in the queue bitmask of a HF core. This causes the system to adjust to the higher data packet transfer rate by reassigning the interface queue from a LF core to a HF core.

Figure 4:
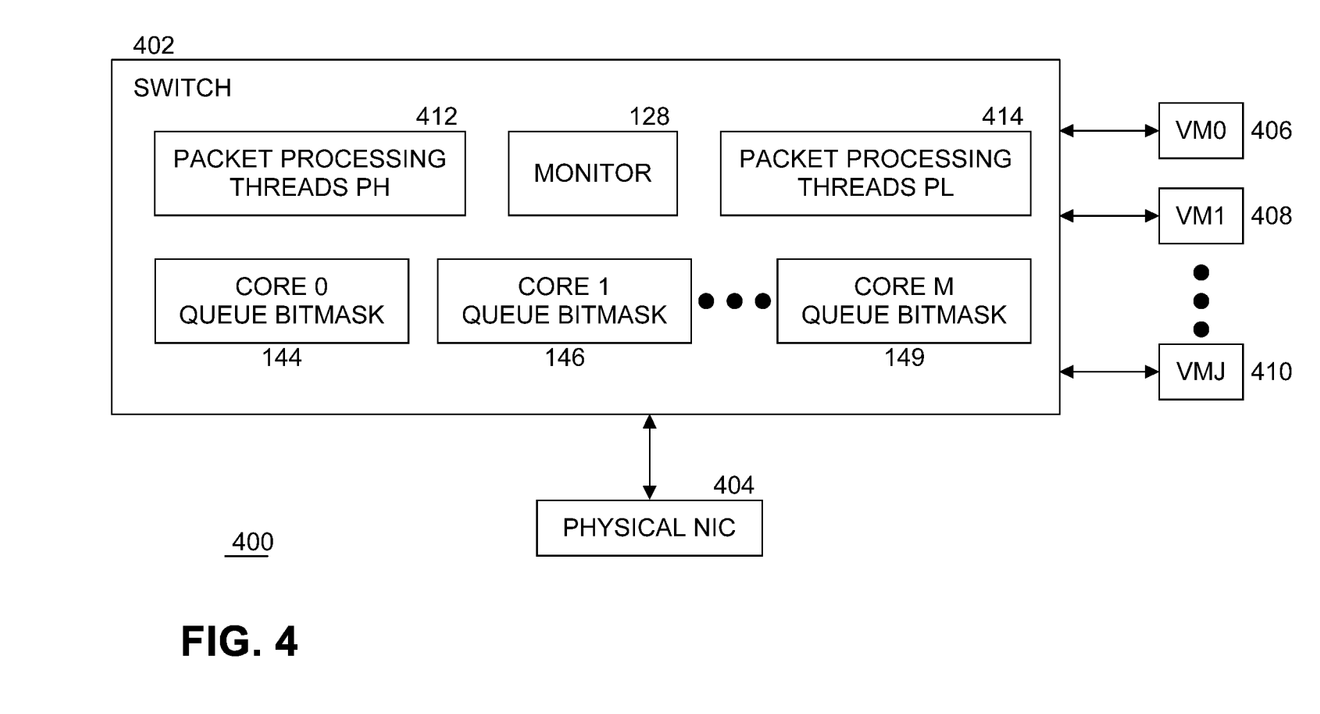
FIG. 4 illustrates an example diagram of a virtual switch.

FIG. 4 illustrates an example diagram of a virtual switch. In an embodiment, virtual switch 402 is an application that when executed on one or more cores of a computing system processes data packets. Switch 402 is coupled to one or more physical NIC devices 404, and a plurality of virtual machine (VMs) such as VM 0 406, VM 1 408, ... VM J 410, where J is a natural number, to receive data packets. In an embodiment, VMs are replaced with containers. As described above, the data packets are stored in interface queues. Switch 402 includes a queue bitmask for each core in the computing system that is executing the switch. In this example, switch 402 includes core 0 queue bitmask 144, core 1 queue bitmask 146, ... core M queue bitmask 149 (assuming M cores in the computing system). Switch 402 includes monitor 128 monitor data packet transfer rates at the interface queues and to initialize and update the queue bitmasks. Switch 402 also includes packet processing threads for high frequency cores (PH) 412 and packet processing threads for low frequency cores (PL).

Below is an example of pseudocode for initialization of the queue bitmasks by monitor 128.

```
©2018 Intel Corporation
B_0 = b_{k-1}b_{k-2} ... b_0, where b_i=1 for i = [0, k - 1]
... (one bitmask B per core)
B_M = b_{k-1}b_{k-2} ... b_0, where b_i=0 for i = [0, k - 1]
func process_bitmask(Q) {
    while (TRUE) {
        for each i in Q {
            s_i = read_burst_of_packets(i, &packets);
            if (s_i <= T ) {
                disable i^{th} bit in bitmask B_m of core m polling queue i
                (where m ∈ C_H)
                    enable i^{th} bit in bitmask B_n of core n polling queue i
                    (where n ∈ C_L)
}}}}
```

In an embodiment, the data packet transfer rate of an interface queue is used, but in other embodiments, there could be other metrics used to determine the processor core load. In one embodiment, a flow lookup rate by the OVS application for the traffic received from a particular interface queue may be used.

Below is an example of pseudocode for using the queue bitmasks when processing packets by a packet processing thread (e.g., PH and PL) running on a core (such as core 0 132, core 1 134, . . . core M 136).

```
©2018 Intel Corporation
func process_packets(B) {
    while (TRUE) {
        for each b_i=1 in B {
            number_of_packets = read_burst_of_packets(i, &packets);
            for each packet j in packets {
                process_packet(packets[j]);
}}}}
```

Figure 5:
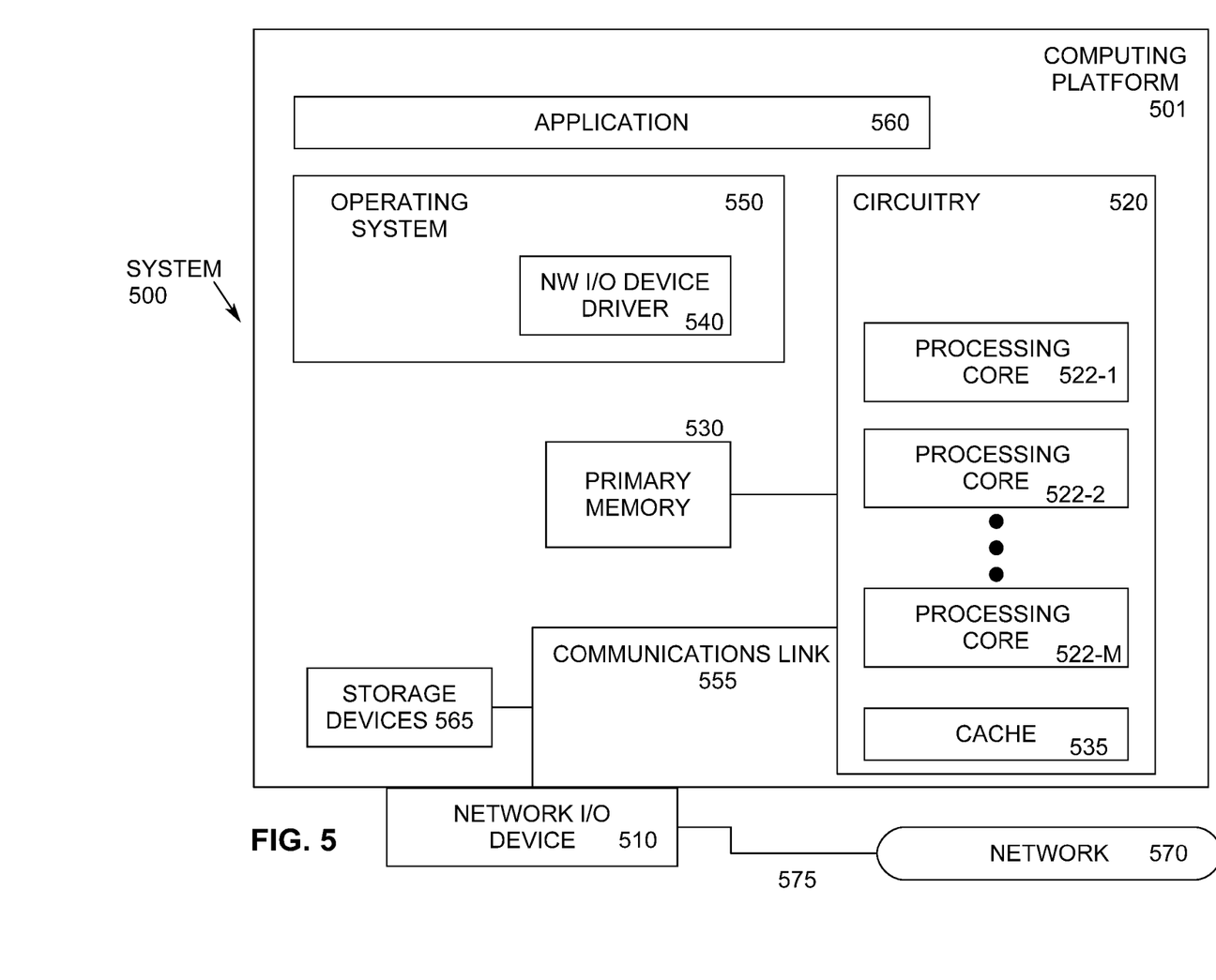
FIG. 5 illustrates an example computing system.

FIG. 5 illustrates an example computing system 500. As shown in FIG. 5, computing system 500 includes a computing platform 501 coupled to a network 570 (which may be the Internet, for example). In some examples, as shown in FIG. 5, computing platform 501 is coupled to network 570 via network communication channel 575 and through at least one network I/O device 510 (e.g., a network interface controller (NIC) such as NIC 404) having one or more ports connected or coupled to network communication channel 575. In an embodiment, network communication channel 575 includes a PHY device (not shown). In an embodiment, network I/O device 510 is an Ethernet NIC. Network I/O device 510 transmits data packets from computing platform 501 over network 570 to other destinations and receives data packets from other destinations for forwarding to computing platform 501.

According to some examples, computing platform 501, as shown in FIG. 5, incldes circuitry 520, primary memory 530, network (NW) I/O device driver 540, operating system (OS) 550, at least one application 560, and one or more storage devices 565. In one embodiment, OS 550 is Linux®. In another embodiment, OS 550 is Windows® Server. Network I/O device driver 540 operates to initialize and manage I/O requests performed by network I/O device 510. In an embodiment, data packets and/or packet metadata transmitted to network I/O device 510 and/or received from network I/O device 510 are stored in one or more of primary memory 530 and/or storage devices 565. In an embodiment, interface queues are stored in one or more of primary memory 530 and/or storage devices 565. In at least one embodiment, application 560 is a packet processing (PP) application such as virtual switch 402 of FIG. 4. Application 560 includes queue polling components and runs on one or more cores. Application 560 may also be run in or in conjunction with one or more VMs. In at least one embodiment, storage devices 565 may be one or more of hard disk drives (HDDs) and/or solid-state drives (SSDs). In an embodiment, storage devices 565 may be non-volatile memories (NVMs). In some examples, as shown in FIG. 5, circuitry 520 may communicatively couple to network I/O device 510 via communications link 555. In one embodiment, communications link 555 is a peripheral component interface express (PCIe) bus conforming to version 3.0 or other versions of the PCIe standard published by the PCI Special Interest Group (PCI-SIG). In some examples, operating system 550, NW I/O device driver 540, and application 560 are implemented, at least in part, via cooperation between one or more memory devices included in primary memory 530 (e.g., volatile or non-volatile memory devices), storage devices 565, and elements of circuitry 520 such as processing cores 522-1 to 522-$m$, where "m" is any positive whole integer greater than 2. In an embodiment, OS 550, NW I/O device driver 540, and application 560 are executed by one or more processing cores 522-1 to 522-$m$. In an embodiment, shared memory 154 of FIG. 1 is implemented by one or more of primary memory 530 and/or storage devices 565.

In some examples, computing platform 501, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 501 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 520 having processing cores 522-1 to 522-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 520 may include at least one cache 535 to store data.

According to some examples, primary memory 530 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 530 may include one or more hard disk drives within and/or accessible by computing platform 501.

In an embodiment, data packets are transmitted to and/or received from network I/O device 510, and packets transferred between cores.

Figure 6:
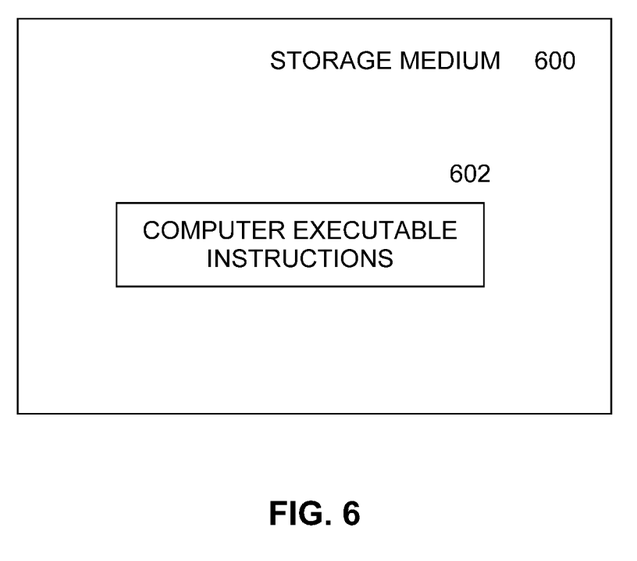
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement logic flow 200 of FIG. 2 (e.g., monitor 128), example pseudocodes, packet processing applications 158, 160, . . . 162 of FIG. 2, and virtual switch 402. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
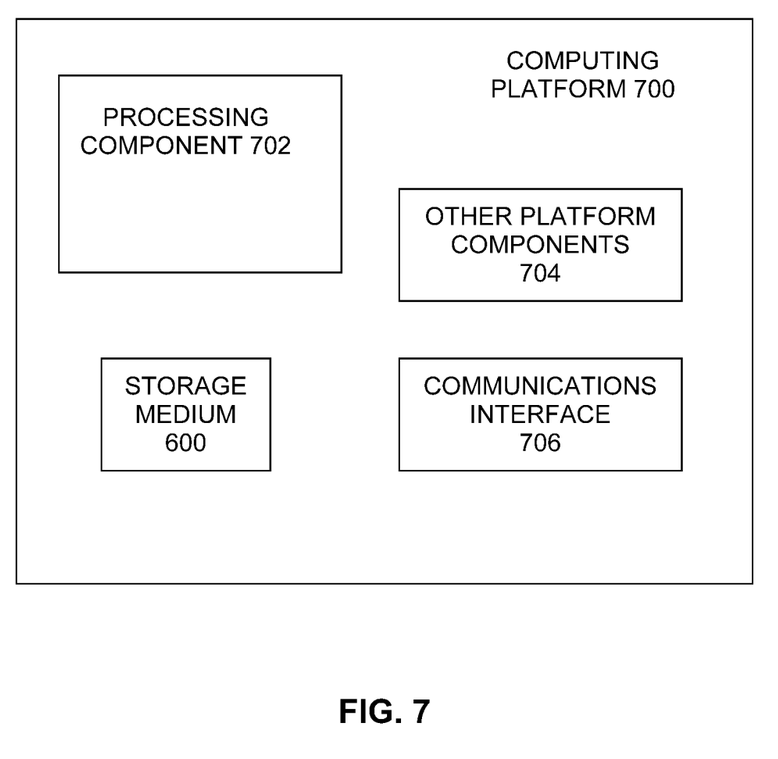
FIG. 7 illustrates another example computing platform.

FIG. 7 illustrates an example computing platform 700. In some examples, as shown in FIG. 7, computing platform 700 may include a processing component 702, other platform components 704 and/or a communications interface 706.

According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   monitoring a data packet transfer rate at an interface queue and
   based at least in part on the data packet transfer rate:
   assigning the interface queue from a core of a first class to a core of a second class, or assigning the interface queue from a core of the second class to a core of the first class, wherein:
      assigning the interface queue from the core of the first class to the core of the second class comprises disabling a bit associated with the interface queue in a bitmask associated with a core of the first class and enabling a bit in the bitmask associated with the interface queue of the core of the second class,
      the bitmask comprises one or more bits,
      a number of bits in the bitmask is based on a number of interface queues, and
      a bit in the bitmask is associated with an interface queue.

2. The method of claim 1, wherein
   the first class comprises one or more cores operating at a first clock frequency,
   the second class comprises one or more cores operating at a second clock frequency, and
   the first clock frequency is higher than the second clock frequency.

3. The method of claim 1, comprising detecting cores of the first class and cores of the second class prior to monitoring a data packet transfer rate at an interface queue.

4. The method of claim 1, comprising assigning a packet processing thread to a core.

5. The method of claim 4, comprising assigning the core to which the packet processing thread is assigned to the interface queue.

6. The method of claim 5, wherein the packet processing thread reads one or more data packets from the interface queue assigned to the core to which the packet processing thread is assigned.

7. The method of claim 1, comprising initializing a bitmask for a core.

8. The method of claim 7, wherein assigning the interface queue from the core of the second class to the core of the first class comprises disabling a bit associated with the interface queue in the bitmask associated with the core of the second class and enabling a bit associated with the interface queue in the bitmask associated with the core of the first class.

9. At least one tangible non-transitory machine-readable medium comprising a plurality of instructions that in response to being executed by at least one processor having a plurality of cores cause the at least one processor to:
- monitor a data packet transfer rate at an interface queue and
- based at least in part on the data packet transfer rate:
- assign the interface queue from a core of a first class to a core of a second class, or assign the interface queue from a core of the second class to a core of the first class, wherein:
  - assign the interface queue from the core of the first class to the core of the second class comprises disable a bit associated with the interface queue in a bitmask associated with a core of the first class and enable a bit in the bitmask associated with the interface queue of the core of the second class,
  - the bitmask comprises one or more bits,
  - a number of bits in the bitmask is based on a number of interface queues, and
  - a bit in the bitmask is associated with an interface queue.

10. The at least one tangible non-transitory machine-readable medium of claim 9, comprising instructions that in response to being executed by the at least one processor, cause the at least one processor to: detect cores of the first class and cores of the second class prior to monitoring the data packet transfer rate.

11. The at least one tangible non-transitory machine-readable medium of claim 9, comprising instructions that in response to being executed by the at least one processor, cause the at least one processor to assign a packet processing thread to a core.

12. The at least one tangible non-transitory machine-readable medium of claim 11, comprising instructions that in response to being executed by the at least one processor, cause the at least one processor to assign a core to the interface queue.

13. The at least one tangible non-transitory machine-readable medium of claim 12, comprising instructions that in response to being executed by the at least one processor, cause the at least one processor to: cause the packet processing thread to read one or more data packets from the interface queue assigned to the core to which the packet processing thread is assigned.

14. The at least one tangible non-transitory machine-readable medium of claim 9, comprising instructions that in response to being executed by the at least one processor, cause the at least one processor to initialize a bitmask for a core.

15. The at least one tangible non-transitory machine-readable medium of claim 14, wherein instructions to assign the interface queue from the core of the second class to the core of the first class comprise instructions to disable a bit associated with the interface queue in the bitmask associated with the core of the second class and enable a bit associated with the interface queue in the bitmask associated with the core of the first class.

16. A system comprising:
- one or more cores; and
- circuitry to monitor a data packet transfer rate at one or more interface queues, and based at least in part on the data packet transfer rate, assign an interface queue of the one or more interface queues from a core of a first class to a core of a second class, or to assign the interface queue from a core of the second class to a core of the first class, wherein
  - the one or more cores comprise the core of the first class and the core of the second class,
  - assign the interface queue from the core of the first class to the core of the second class comprises disable a bit associated with the interface queue in a bitmask associated with a core of the first class and enable a bit in the bitmask associated with the interface queue of the core of the second class,
  - the bitmask comprises one or more bits,
  - a number of bits in the bitmask is based on a number of interface queues, and
  - a bit in the bitmask is associated with an interface queue.

17. The system of claim 16, wherein
- the first class comprises one or more cores operating at a first clock frequency,
- the second class comprises one or more cores operating at a second clock frequency, and
- the first clock frequency is higher than the second clock frequency.

18. The system of claim 16, comprising circuitry to detect cores of the first class and cores of the second class.

19. The system of claim 16, comprising circuitry to assign a packet processing thread to a core.

20. The system of claim 19, comprising circuitry to assign a core to the interface queue.

21. The system of claim 20, wherein the packet processing thread is to read one or more data packets from the interface queue assigned to the core to which the packet processing thread is assigned.

22. The system of claim 16, wherein the circuitry to monitor is to initialize a bitmask for a core.

23. The system of claim 22, wherein the circuitry to monitor is to assign the interface queue from the core of the second class to the core of the first class by disable a bit associated with the interface queue in the bitmask associated with the core of the second class and enable a bit associated with the interface queue in the bitmask associated with the core of the first class.

* * * * *